Jan. 8, 1957 — A. H. HEINRICH — 2,776,851
SEALING SYSTEMS
Filed June 1, 1953 — 3 Sheets-Sheet 2
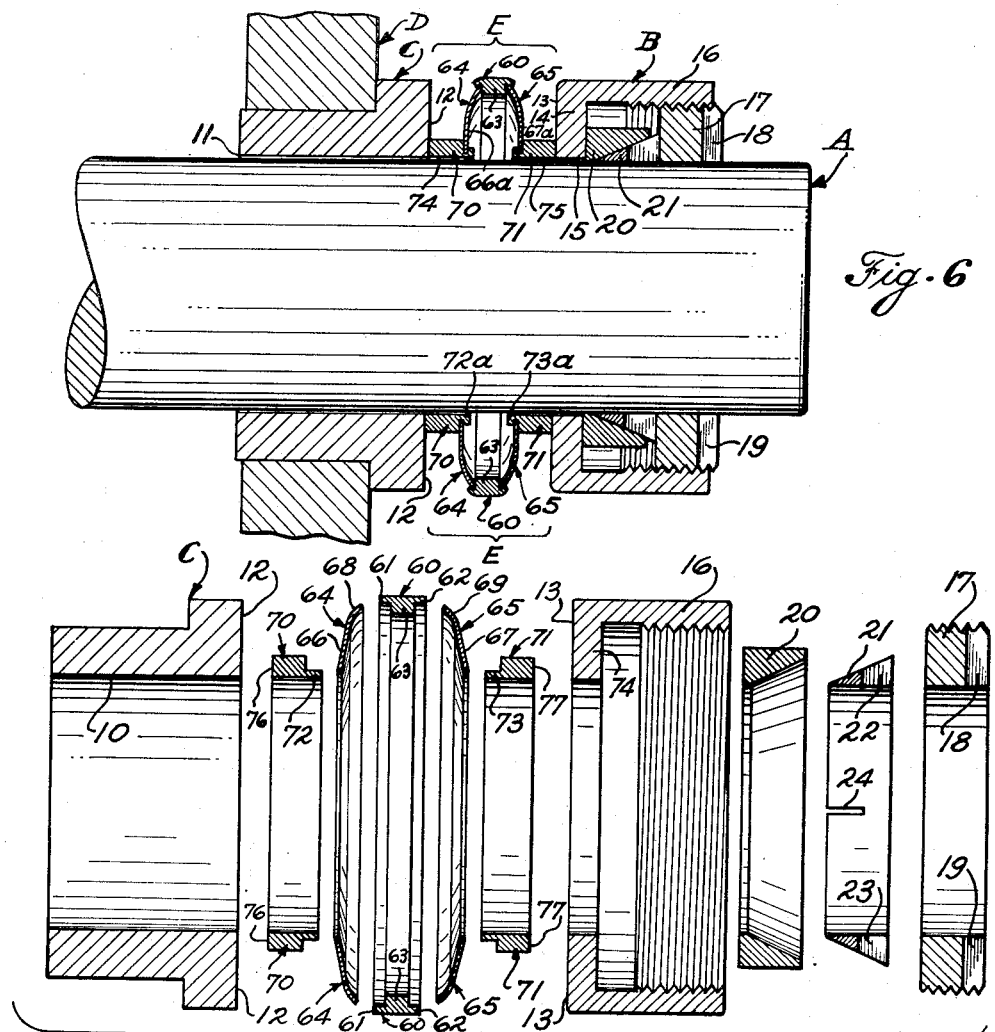
Fig. 6
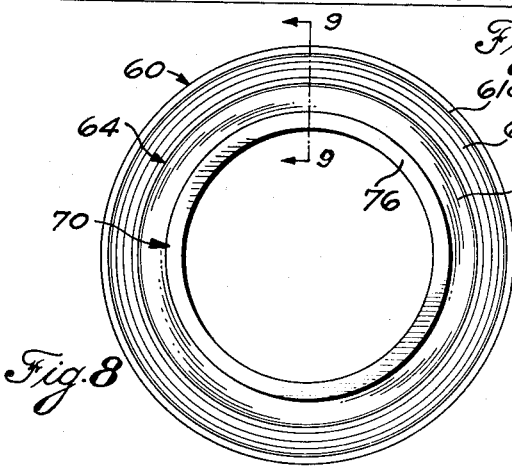
Fig. 7
Fig. 8
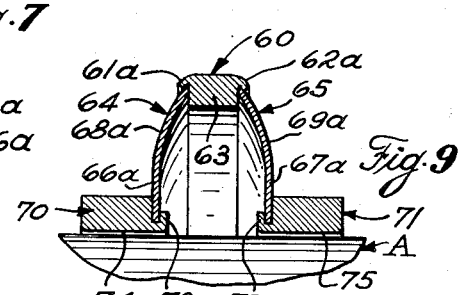
Fig. 9
INVENTOR.
AUGUST H. HEINRICH
BY Bosworth, Sessions, Herrstrom & Williams
ATTORNEYS Jan. 8, 1957 A. H. HEINRICH 2,776,851
SEALING SYSTEMS
Filed June 1, 1953 3 Sheets-Sheet 3
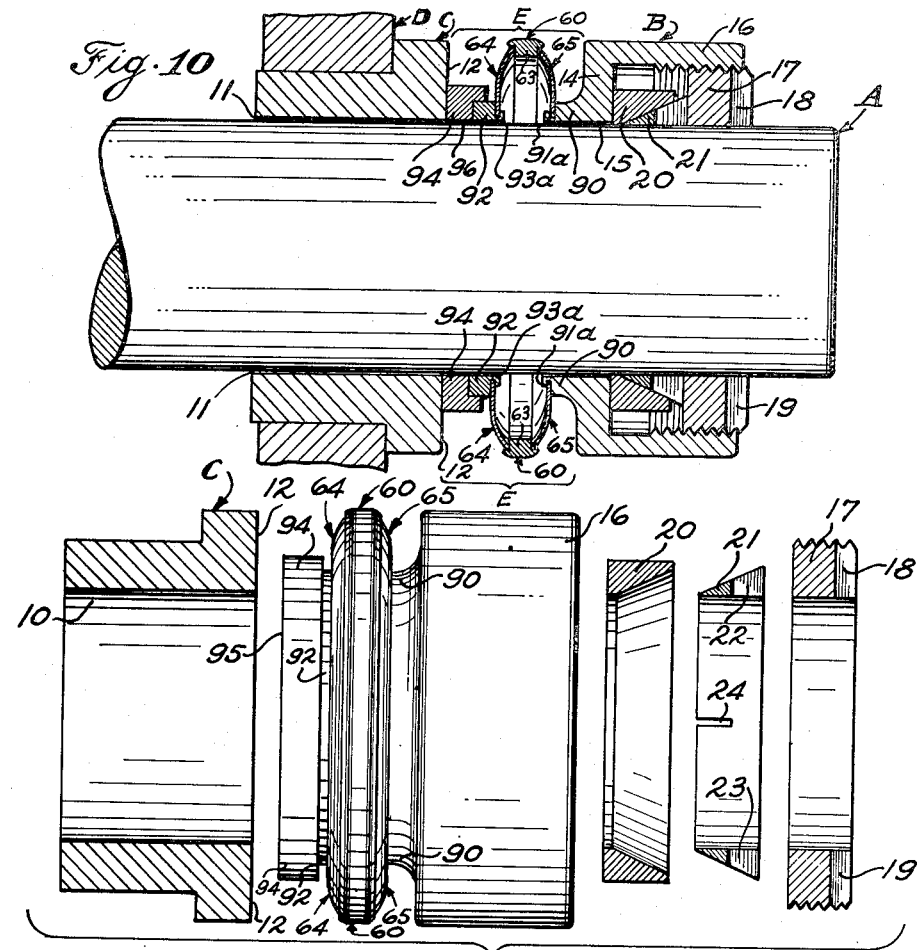
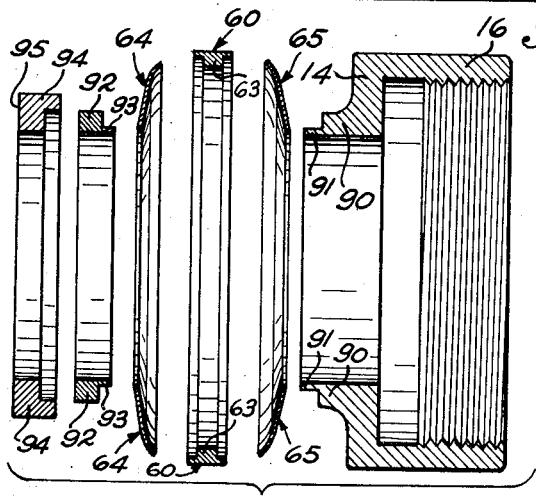
INVENTOR.
AUGUST H. HEINRICH
ATTORNEYS United States Patent Office 2,776,851
Patented Jan. 8, 1957

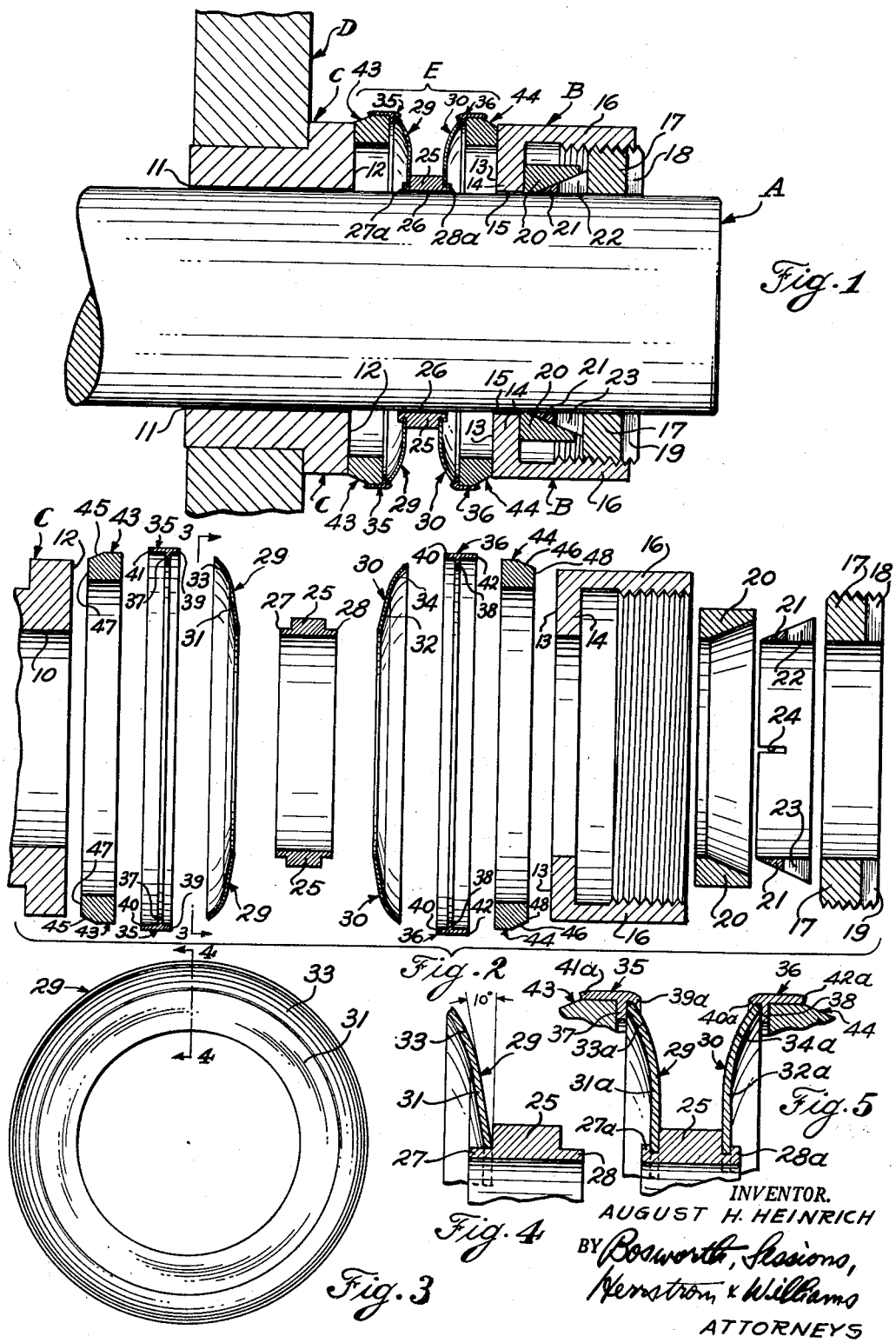

2,776,851

SEALING SYSTEMS

August H. Heinrich, Euclid, Ohio

Application June 1, 1953, Serial No. 358,745

6 Claims. (Cl. 286—11)

This invention relates to a sealing system for shafts, ball bearing assemblies, roller bearing assemblies and the like in which the sealing unit is largely or entirely made up of metal components to the exclusion of non-metallic sealing rings, packings, washers, etc.

In industry generally there is a need, not heretofore satisfactorily met, for sealing systems capable of standing up under adverse conditions, particularly such as temperatures above ordinary room temperatures, conditions of high humidity, and environmental atmospheres characterized by the presence of steam, chemical vapors and other troublesome factors. Often the incidence of one or more of these is complicated by the presence of sub- or super-atmospheric pressures, either within or without a particular piece of equipment. When this is so, prevailing conditions usually lead to quick deterioration, impairment of function and sometimes even to physical disintegration of sealing units characterized by non-metallic sealing rings, packings, washers and similar components.

According to the present invention, non-metallic components, particularly such as are vulnerable under the conditions just mentioned, are largely omitted. In lieu thereof, metallic components selected for their ability to stand up under adverse conditions are employed. Metallic components generally stand up to much better advantage than most non-metallic components under difficult conditions of temperature, pressure, humidity, etc.; in addition, they lend themselves to accurate finishing and can be held to close tolerances, thus permitting of the use of minimum clearances where there is to be relative movement between contacting parts. Accordingly, sealing systems of the kinds with which the present invention deals tend to stand up for much longer periods of time without replacement than conventional sealing systems incorporating sealing units of the kinds heretofore used in industry generally, including the chemical industries.

It is a principal object of the present invention to provide a sealing system incorporating a sealing unit that can be used without replacement for long periods of time. It is a further object of the invention to provide sealing systems that are adaptable to widely differing uses, as, for example, in the sealing of a projecting shaft end against the entry of an extraneous contaminant into the machine of which it forms a part. It is a further object of the invention to provide sealing units that are fluid-tight but susceptible nevertheless of limited movement in response to changing pressure conditions, displacement of moving parts, etc., this without impairing the maintenance of the seal against the ingress or egress of fluids.

A further object of the invention is to provide sealing units, particularly sealing units that may be made, stocked and sold as such, that are characterized by at least a degree of pre-loading. By pre-loading as herein used is meant a condition in which the sealing unit is already stressed and capable of being maintained under stress before its installation in equipment of the type for which it is designed. Normally, its installation involves some moderate additional stressing of the sealing unit, such being comparable to the stressing of ordinary sealing units of the kinds heretofore known in the course of their installation in industrial equipment. In the present invention, the latter type of loading, which is effected only in limited degree, is superimposed on the stresses already introduced by the pre-loading of the sealing unit.

Other objects and advantages of the invention will be apparent from the description which follows and from the accompanying drawings, in which:

Figure 1 is a central section of a shaft-sealing system, the same being shown on a scale that is twice the normal size.

Figure 2 is an exploded view showing the components employed in the shaft sealing system of Figure 1, likewise in central section.

Figure 3 is an elevation of one of the annular springs shown in Figure 2, the same being seen as if from line 3—3 of Figure 2.

Figures 4 and 5 are fragmentary sections on a scale that is double the scale of Figures 1 to 3 inclusive.

Figure 6 is a section comparable to Figure 1 showing a somewhat different shaft sealing system.

Figure 7 is an exploded view corresponding thereto.

Figure 8 is an elevation of the sealing unit of Figures 5 and 6 as seen apart from the installation in which it is used.

Figure 9 is a section of the sealing unit as seen from line 9—9 of Figure 8 on twice the scale of Figure 8.

Figure 10 is a central section through still another shaft-sealing system.

Figure 11 is an exploded view showing all of the components thereof separated from each other except those making up the sub-assembly consisting of the sealing unit and the collet housing.

Figure 12 is an exploded view showing the components forming part of such sub-assembly.

In certain of the figures just mentioned, clearances are sometimes shown in exaggerated fashion in the interests of clarity of representation.

Figures 1 to 5, inclusive, show one of the preferred forms of the invention. As in the case of each of the several embodiments of the invention shown in the accompanying drawings, there is a shaft A, a first annular member B mounted on the shaft, such first annular member here taking the form of a collet housing, a second annular member C, shown as taking the form of a bushing, that is fixedly mounted on or in a supporting element D which forms part of a gear box, a pump, a motor, a generator, a turbine or the like, and, between the first annular member and the second annular member, a sealing unit E extending transversely of the shaft. As in all of the various forms of the invention about to be described, the sealing unit E incorporated in the sealing system of Figure 1 can be said to be movable relative to at least one of the two annular members and to be characterized by at least one radially disposed metal spring of generally annular shape that is pre-loaded before it is installed.

Referring to Figures 1 and 2 and particularly to the elements shown near the left hand ends thereof, the stationary bushing C is provided with a circular bore 10 (Figure 2). The latter receives and accommodates shaft A, which is mounted for free rotation in bushing C. Between them there is clearance of about .005", such clearance being indicated in exaggerated fashion at 11 in Figure 1. The end face 12 of bushing C immediately adjoining sealing unit E is finished to a high degree of precision, being ground and lapped to a degree of smoothness within two light bands. On collet housing B an opposing end face 13 is finished in the same way to the same high degree of precision.

As best shown in Figure 2, end face 13 is formed on an inwardly-directed annular flange 14 of the nature of an abutment that constitutes an integral part of collet housing B. Between shaft A and flange 14 is a clearance 15 of about .005", such clearance being shown in exaggerated fashion in Figure 1. Collet housing B is formed with an interiorly-threaded generally cylindrical body portion 16, open at one end, which body portion and open end extend away from sealing unit E in a direction paralleling the axis of shaft A. The threaded portion of the collet housing carries an exteriorly-threaded collet nut 17 provided with oppositely located slots 18 and 19 for a manipulating tool. By means thereof, collet nut 17 may be moved axially of the shaft A toward or from flange 14, as may be desired.

In the space between flange 14 and collet nut 17, as is usual in constructions of this sort, are to be found an outer collet ring 20 and an inner collet ring 21 both of which are machined to close tolerances. They have the form shown in Figure 2. As there indicated, collet ring 21 is provided with two pairs of diametrically opposed peripheral slots of which one pair, 22 and 23, extends forward from the trailing end of the collet ring and the other pair, of which only slot 24 appears in the drawings, extends rearward from the leading end of the collet ring. When collet nut 17 is forced by the manipulating tool into engagement with the trailing end of collet ring 21, a condition shown in Figure 1, collet nut 17 not only urges collet ring 21 into engagement with collet ring 20 but also into engagement with shaft A. A highly efficient fluid-tight seal is thus established between shaft A and collet housing B.

In the form of the invention shown in Figures 1 to 5, the sealing unit E includes a centrally located metal annulus 25 of the nature of a spacer or connecting element. It rides on shaft A with a running fit; i. e., with a clearance 26 measuring about .005 to .010". As best seen in Figure 2, spacer 25 in its original form is characterized by two axially-directed end collars 27 and 28 which collars provide square shoulders of circular contour where they impinge on the body portion of the spacer. These shoulders are similar in size and shape and are provided in order to receive and accommodate the edges of two wafer-like elements 29 and 30 of spring metal stock having a thickness of .004 to .020", preferably about .010". In the preferred form of the invention, the latter are of the nature of and act as annular leaf springs. They are identical in all respects. The central opening in the one fits snugly around collar 27 on spacer 25; similarly, the central opening in the other fits snugly around collar 28.

In their original form, i. e., before being mounted on spacer 25, annular springs 29 and 30 have the shape best shown in Figure 4, which illustrates annular spring 29 as it appears when in the process of being mounted on collar 27. As there shown, annular spring 29 is characterized by an inner frusto-conical portion 31 the elements of which define an angle of about 80 degrees to the central axis of spacer 25; i. e., an angle of about 10 degrees to a plane normal to the axis of shaft A. Outwardly of the flat area formed by slanted portion 31, annular spring 29 is provided with an arcuate portion 33 which merges into slanted portion 31. When annular spring 29 has an outer diameter of 1⅝" and an inner diameter of 1", as in the case of the shaft-sealing system illustrated in Figures 1 and 2, arcuate portion 33 thereof may have a radius of curvature in the range between 1/64" and ½", preferably approximately 1/16". In the form shown, the length of slanted portion 31, measured radially, is roughly about 50% longer than the comparable length of arcuate portion 33.

Annular spring 30 is interchangeable with annular spring 29, both being susceptible of being formed in a die capable of imparting the configuration shown in Figure 4.

In the process of assembling sealing unit E, annular springs 29 and 30 are first brought into engagement with end collars 27 and 28 on spacer 25, after which collars 27 and 28 are mechanically turned over onto slanted portions 31 and 32 of annular springs 29 and 30, respectively. The precise manner in which collars 27 and 28 are turned over into contact with the proximate faces of annular springs 29 and 30 is not particularly important. So long as the resulting joint is fluid-tight, it may be done by crimping, spinning, rolling or in any similar way which results in effectively heading over collars 27 and 28 onto slanted portions 31 and 32. It is, however, very important that the joint be leak-proof at least as regards conventional machine lubricants and better if it is airtight. The latter standard is one that can be achieved without undue difficulty in shop practice.

In the performance of these operations, annular springs 29 and 30 are mechanically stressed, being forced into positions in which the slanted portions 31 and 32 thereof are substantially normal to the central axis of spacer 25. This is apparent from Figure 5, from which, by comparison with Figure 4, it will be evident that the inclination that previously characterized the inner portion 31 of annular spring 29 has completely disappeared. At this stage and as a result of carrying out these steps, annular springs 29 and 30 are considerably stiffened. Instead of being "dead," they manifest a moderate degree of spring action. Thus the operation of turning over collars 27 and 28 onto the adjacent peripheral edges of annular springs 29 and 30 must serve to some extent to pre-load springs 29 and 30. The joints themselves appear to constitute the loading means.

The sub-assembly so formed, comprising spacer 25 and annular springs 29 and 30, is then further stressed by mounting on the outer peripheral edge portions of annular springs 29 and 30 two mutually similar steel retaining rings 35 and 36. The latter are applied and affixed to the outer edges of arcuate portions 33 and 34 of annular springs 29 and 30. As best seen in Figure 2, retaining rings 35 and 36 are provided with inwardly-directed annular flanges 37 and 38, respectively. These inwardly-directed flanges provide square shoulders of circular contour against which the outer peripheral edges of annular springs 29 and 30 can seat. When retaining rings 35 and 36 have been brought into apposition to the edges of annular springs 29 and 30, portions of the former are turned over into contact with the latter to provide fluid-tight joints where annular springs 29 and 30 abut against flanges 37 and 38.

As indicated in Figure 2, retaining rings 35 and 36, as originally formed are characterized by short axially-extending cylindrical portions 39 and 40 of approximately the same dimensions as flanges 37 and 38. These portions are turned over against annular springs 29 and 30 by crimping, spinning, rolling or a similar operation in a manner such as to cause retaining rings 35 and 36 to grip and hold the outer peripheral edges of arcuate portions 33 and 34 of annular springs 29 and 30, respectively. The radius of curvature of arcuate portions 33 and 34 tends to increase rather markedly with the performance of the heading-over operation with the result that thereafter each of the annular springs 29 and 30 as seen in radial section presents the appearance of a smooth curve. This provides a more smoothly faired surface contour over the spring as a whole. In consequence of affixing retaining rings 35 and 36 to annular springs 29 and 30, the latter are stressed and stiffened still further, giving an enhanced spring action. It appears that the joints introduced by retaining rings 35 and 36, in addition to performing sundry other functions, to some extent act to pre-load annular springs 29 and 30.

At this stage, although headed over as described, retaining rings 35 and 36 are still provided with axially-extending cylindrical portions 41 and 42 (Figure 2) of considerably greater length than cylindrical portions 39 and 40. Cylindrical portions 41 and 42, which extend away from spacer 25 and annular springs 29 and 30, are provided so that they may receive, cooperate with and hold in place two bronze sealing rings 43 and 44 which, together with the retaining rings themselves, constitute means for sealing the outer peripheral edges of annular springs 29 and 30. As indicated in Figure 2, sealing rings 43 and 44 are provided at the ends thereof that face away from the spacer 25 with beveled portions 45 and 46, respectively. When sealing rings 43 and 44 are brought into contact with and seated against the inwardly-directed flanges 37 and 38 on retaining rings 35 and 36, cylindrical portions 41 and 42 of retaining rings 35 and 36 may be turned over against the beveled portions 45 and 46 of sealing rings 43 and 44. This may conveniently be done, as before, by crimping, spinning, rolling or the like in a manner such as to form a fluid-tight joint.

Sealing rings 43 and 44, if desired, may with equal propriety be described as bearing rings. The reason resides in the fact that their end faces 47 and 48 are to be in bearing contact with the ground and lapped surfaces 12 and 14 on bushing C and collet housing B, respectively. With that in mind, the end faces 47 and 48 of sealing rings 43 and 44 are preferably finished in the same manner and to the same high degree of precision as the surfaces 12 and 13; i. e., ground and lapped within two light bands. This degree of precision provides a fluid-tight sealing action where sealing unit E is to abut against collet housing B or bushing C, as the case may be.

In performing the above-described sequence of operations, parts of spacer 25 and parts of retaining rings 35 and 36 are distorted in the manner and for the reasons explained above. Collars 27 and 28 on spacer 25 thereafter present the appearance indicated at 27a and 28a in Figure 5. Cylindrical portions 39 and 40 of retaining rings 35 and 36 assume the form shown at 39a and 40a. Cylindrical portions 41 and 42 take the shape shown at 41a and 42a. As previously explained, annular springs 29 and 30 are likewise distorted from their original form, slanted portions 31 and 32 assuming the new positions indicated in Figure 5 at 31a and 32a. Arcuate portions 33 and 34 develop the longer radius of curvature shown at 33a and 34a, respectively.

Along both peripheral edges thereof, annular springs 29 and 30 are stressed by the action of the portions which are turned over into contact with them. In this sense, the sealing unit E can be said to be pre-loaded. When compressed between the fingers, sealing rings 43 and 44 will move toward each other against the resistance of annular springs 29 and 30. The latter rather strongly resist such movement and, when the applied force is released, promptly return sealing rings 33 and 34 to their original positions. The "dead" feeling that characterizes annular elements in unstressed condition is absent, having been replaced by a resilient springiness. Any tendency to collapse, which would be developed in the absence of pre-loading, is entirely obviated.

In assembling the sealing system illustrated in Figure 1, sealing unit E is brought into apposition to the projecting end of shaft A, after which it is moved lengthwise of the shaft until bearing face 47 of sealing ring 43 makes contact with end face 12 on bushing C. Thereafter collet housing B, including collet rings 20 and 21 and collet nut 17, is brought into apposition to and is moved lengthwise of shaft A until end face 13 comes into contact with bearing face 48 on sealing ring 44. Up to this stage, collet nut 17 should be located in some intermediate position short of its final position in the collet housing, this so as to avoid placing pressure on collet rings 20 and 21, particularly the latter.

With the parts in this relationship, collet housing B is then urged manually into firm contact with sealing unit E, after which collet nut 17 is tightened to force collet rings 20 and 21 into wedging engagement with each other. This causes collet ring 21 to engage and grip the surface of shaft A. In this manner a moderate force of perhaps about 10 to 15 lbs. can be exerted on sealing unit E, this in addition to the stresses introduced into it by pre-loading annular springs 29 and 30. The force exerted by collet housing B may of course be varied by manipulating collet nut 17 and body portion 16 of the collet housing B, which is adjustably mounted on shaft A. Thus the sealing unit is mounted in a fashion permitting it to "float" at approximately half the speed of shaft A between a first adjustably-mounted generally annular member of the nature of an abutment (collet housing B) and a second rigidly-mounted generally annular member (bushing C), the latter forming part of a structural element D of a gear box or the like.

A second preferred form of the invention is illustrated in Figures 6 to 9, inclusive, in which the departures from what is shown in Figures 1 to 5 reside in the construction of sealing unit E. In the sealing system of Figure 6, steel spacer 60, rather than riding on shaft A, rotates in a zone well removed from the periphery of the shaft; on the other hand, the bronze sealing rings, which in the sealing system of Figure 1 are located away from the periphery of the shaft near the outer edges of annular members B and C, ride directly on the shaft. In the embodiment of the invention shown in Figures 6 to 9, the sealing unit E is somewhat simpler than that previously described, consisting of the five parts appearing in Figure 7 between surface 13 on collet housing B and surface 12 on bushing C.

As indicated in Figure 7, spacer 60 in its original form has two axially-extending cylindrical portions 61 and 62 and, between them, a body portion 63. This construction provides an inwardly-directed flange with square shoulders of circular configuration against which annular springs 64 and 65 can seat. Annular springs 64 and 65 have composition, shape and dimensions the same as annular springs 29 and 30 in the form of the invention already described; however, in forming the sealing unit they are assembled in such manner that their outer peripheries abut spacer 60 and their inner peripheries abut the sealing rings. Annular springs 64 and 65 have near their inner peripheries slanted portions 66 and 67, respectively, which merge into arcuate portions 68 and 69, the latter having a radius of curvature of about $\frac{1}{16}''$.

When the sealing unit of Figures 6 to 9 is being assembled, annular springs 64 and 65 are brought into juxtaposition to spacer 60. With the springs seated in proper position, cylindrical portions 61 and 62 of spacer 60 are turned over against the adjoining peripheral edges of annular springs 64 and 65, this by crimping, spinning, rolling or the like. It is important that this be done in such manner as to provide a fluid-tight joint, preferably an air-tight joint. The relationship of the parts after this operation is performed is evident from Figure 9, which shows the modified shapes of these parts 61a, 62a, 68a and 69a.

This having been done, sealing rings 70 and 71 are then located in proper relation to slanted portions 66 and 67 of annular springs 64 and 65. As indicated in Figure 7, sealing rings 70 and 71 are of integral construction, so that separate retaining rings are unnecessary in and to the sealing means in this embodiment of the invention; however, they do have the axially-extending end collars 72 and 73 shown in Figure 7. In order to arrive at the assembled construction shown in Figure 6, these parts of sealing rings 70 and 71, which are of bearing bronze, are peened before the sealing rings are assembled with annular springs 64 and 65. Where such a peening operation is performed on end collars 72 and 73, the latter may readily be turned over against the proximate portions of annular springs 64 and 65: see 72a and 73a in the sealing system of Figure 6. End faces 76 and 77 on sealing rings 70 and 71 are preferably ground and lapped to provide fluid-tight engagement with surfaces 12 and 13 on bushing B and collet housing C, respectively. Between sealing rings 70 and 71 and shaft A are clearances 74 and 75, such clearances being of the order of .005 to .010".

The effect of mechanically joining annular springs 64 and 65 to spacer 60 and to sealing rings 70 and 71 is to stiffen and pre-load annular springs 64 and 65. In consequence, when the pressure of the fingers is applied to sealing unit E, springs 64 and 65 are not lifeless, after the fashion of unstressed metal annuli, but shown considerable resistance to compression. They do not collapse under the pressure of the fingers and they recover almost instantaneously when the pressure is removed. When collet housing B is mounted on shaft A as already described in connection with the embodiment of the invention shown in Figure 1, the sealing unit E of Figures 6 to 9 is placed under additional stress, perhaps about 10 to 15 lbs., but not under so much additional stress as to interfere with its freedom to "float" at approximately half the speed of shaft A in touching contact with the adjoining faces of collet housing B and bushing C.

The fact that annular springs 64 and 65 are under stress even before sealing unit E is located in its final position between the bushing and the collet housing is evidenced by the fact that as seen in radial cross section each of the two annular springs 64 and 65 develops a smooth curve similar to that of annular springs 29 and 30 as shown in Figure 5. The surfaces thereof present the same smoothly faired contour as annular springs 29 and 30. The joints at the inner and outer peripheral edges of annular springs 64 and 65 appear to be responsible for the development of these changes in the shape of annular springs 64 and 65. Even when sealing unit E is removed from the sealing system shown in Figure 6, annular springs 64 and 65 continue to be maintained under moderate stress by spacer 60 and sealing rings 70 and 71.

A modified form of sealing system is shown in Figures 10 to 12, inclusive. In this embodiment of the invention, collet housing B is provided with a neck 90 which in its original form has an axially-extending collar 91 (Figure 12). Instead of being mounted on a sealing ring, annular spring 65 is mounted directly on collar 91 of neck 90 of collet housing B. The mounting of annular spring 65 is accomplished by turning over collar 91 against the inner face of the slanted portion of annular spring 65. After collar 91 has been turned over into contact with annular spring 65, it forms a fluid-tight seal and presents the appearance indicated at 91a in Figure 10. Sealing unit E rotates with the collet housing, which of course rotates at the same speed as shaft A.

Between annular spring 65 and the collet housing B no sealing ring is necessary and the end face of the collet housing therefore need not be finished with the same precision as in the forms of the invention previously described. On the other hand, annular spring 64 is received at its inner edge in a steel mounting ring 92 provided with an axially-extending collar 93 (Figure 12). Mounting ring 92 forms part of the sealing means for annular spring 64. It is soldered or brazed to bronze bearing ring 94, which is provided with a ground and lapped end face 95 abutting the ground and lapped surface 12 on bushing C. Precise finishing of these parts is necessary to the development of a fluid-tight seal at this point.

After collar 93 on mounting ring 92 is turned over against the inner face of annular spring 64, these parts assume the appearance indicated at 93a (Figure 10).

In this form of the invention, collet housing B and sealing unit E may be considered to constitute a sub-assembly. It is shown as such in Figure 11. Figure 12 illustrates how the parts which make up this sub-assembly appear when in their original condition; i. e., before deformation to introduce the mechanical joints by which spacer 60, annular springs 64 and 65, mounting ring 92, bearing ring 94 and collet housing B are interconnected with each other. The introduction of these joints apparently serves to load each of annular springs 64 and 65 and thus to pre-load sealing unit E in substantially the manner already described.

The various embodiments of the invention described above and shown in the accompanying drawings are well adapted for use in sealing systems such as are used for sealing shafts, bearings, etc., against the escape of lubricants or the entry of contaminants. The various sealing units forming part of such sealing systems depart from conventional sealing units of the kinds known to the prior art in that they include pre-loaded annular springs maintained in a condition of stress by loading means operating on their inner and/or outer peripheral edges. Where such peripheral edges are connected to the sealing means, there may or may not be a retaining or mounting ring in addition to the sealing or bearing ring, but the connection is preferably of a nature such as to tension and thus pre-stress the spring or springs. At the other peripheral edge of the spring or springs, the connection may be to a spacer, to a shaft abutment such as a collet housing, or to the outer race of a ball bearing assembly or the like, but again the joint is preferably of a nature such as to place pre-loading tensile stress on the spring or springs.

The magnitude of the pre-load on the spring or springs can vary somewhat, depending on the construction, but with two springs it will normally be of the order of 5 to 25 lbs. or more.

It is evident that changes may be made by those skilled in the art without departing from the principles of the invention. Where bronze is suggested, graphite bronze and similar bearing metals containing carbonaceous inclusions may be employed. In some instances, the sealing ring may be made of carbon, pressed or otherwise worked to give it suitable shape and smoothness of surface; in such case, a metal retaining shell many, if desired, be used with it. It is also possible to use sintered metal sealing rings formed by modern powder metallurgy techniques; e. g. a bearing ring of "Oilite" may be used. "Stellite" may also be used for this purpose.

The use of a separate retaining or mounting ring will sometimes be found to be desirable, particularly where its use permits of greater ease in forming joints of the types described. In other instances, as in the embodiment of the invention shown in Figures 6 to 9, the sealing ring may be unitary, requiring no retaining or mounting ring in conjunction therewith. In the latter case, it may be partly or entirely pre-worked, as by peening, to facilitate formation of the desired fluid-tight connection between the sealing ring and the spring. This treatment is especially useful where sintered metal sealing rings are employed.

For the annular spring or springs, a wide variety of spring metals is available, including spring brass, spring steel, stainless steel, nickel-chromium alloys, etc.

Where the spring or springs are in engagement with a spacer, retaining ring, abutment, inner race, outer race or other like piece, the part to which the connection is made may in most cases be of ordinary steel or any other suitable metal that lends itself to heading over in the manner described. In general, what is required is at least one joint of a type that will enhance the intrinsic springiness of the spring or springs, thereby introducing into the unit the type of pre-loading to which reference has been made. In some cases, within the limits just stated, the joint between the spring or springs and the sealing means, spacer, abutment or race, as the case may be, may be effected in some other manner, as by soldering, brazing or the like. Similarly, by providing a pre-formed recess for the edge of the spring in or on the sealing means, spacer, abutment or race, the tensile stresses in the spring or springs may be partially reduced ("relieved"). They may also be reduced or relieved by forming the spacer as a stamped channel with the bight in the channel facing away from the spring or springs.

As appears from what has already been said, the sealing unit can consist at minimum of a sealing or bearing ring, with or without a retaining or mounting ring, to which an annular spring is affixed in such manner as to pre-load it. In the more elaborate forms, in which the sealing unit is symmetrical about a central plane transverse to the axis of the shaft, there may be two sealing rings, two annular springs and an intervening spacer or connecting element, the latter occupying a zone close to the periphery of the shaft if the sealing means are located away from the shaft and occupying a position spaced from the shaft if the sealing means are in a zone adjoining the shaft periphery. Other arrangements are possible involving more than two springs and/or springs having more than one arcuate portion; e. g., two, three or more such portions in concentric relation to each other, particularly for large size installations, as in rolling mills.

It is intended that the patent shall cover, by summarization in the appended claims, all features of patentable novelty residing in the invention.

What is claimed is:

1. A shaft sealing unit comprising a first sealing ring, a first annular mounting element carrying said sealing ring, and, carrying said mounting element, a first metal leaf spring of annular shape which spring, adjacent its inner periphery, has a flat portion of annular shape that extends substantially normally to the longitudinal axis of the sealing unit and, between said flat portion and its outer periphery, an annular concavo-convex portion of short radius of curvature, said flat portion and said concavo-convex portion of short radius of curvature having an annular zone of contiguity located well within the outer periphery of the spring; a second sealing ring, a second annular mounting element carrying said sealing ring, and, carrying said mounting element, a second metal leaf spring of annular shape which spring, adjacent its inner periphery, has a flat portion of annular shape that extends substantially normally to the longitudinal axis of the sealing unit and, between said flat portion and its outer periphery, an annular concavo-convex portion of short radius of curvature, said flat portion and said concavo-convex portion of short radius of curvature having an annular zone of contiguity located well within the outer periphery of the spring; and, disposed between the two springs, means interconnecting said first spring and said second spring for maintaining the flat portions of the two springs in substantially normal relation to the longitudinal axis of the sealing unit.

2. A sealing unit for shafts, bearings and the like comprising an annular sealing element; an annular mounting element carrying said sealing element; a metal leaf spring of annular shape carrying said mounting element along one of its two peripheries which spring, adjacent its inner periphery, has a flat portion extending substantially normally to the axis of the sealing unit and, between said flat portion and its outer periphery, a concavo-convex portion of short radius of curvature, said flat portion and said concavo-convex portion of short radius of curvature having in common a zone of contiguity located in a part of the spring that is free to flex; and means on the periphery of the spring opposite to the periphery carrying the mounting element for maintaining the flat portion of the spring in substantially normal relation to the axis of the sealing unit.

3. A sealing unit for shafts, bearings and the like comprising an annular sealing element; an annular mounting element carrying said sealing element; a metal leaf spring of annular shape carrying said mounting element along its outer periphery which spring, adjacent its inner periphery, has a flat portion extending substantially normally to the axis of the sealing unit and, between said flat portion and its outer periphery, a concavo-convex portion of short radius of curvature, said flat portion and said concavo-convex portion of short radius of curvature having in common a zone of contiguity located in a part of the spring that is free to flex; and, along the inner periphery of the spring, means for maintaining the flat portion of the spring in substantially normal relation to the axis of the sealing unit.

4. A sealing unit for shafts, bearings and the like comprising an annular sealing element; an annular mounting element carrying said sealing element; a metal leaf spring of annular shape carrying said mounting element along its outer periphery which spring, adjacent its inner periphery, has a flat portion extending substantially normally to the axis of the sealing unit and, between said flat portion and its outer periphery, a concavo-convex portion of short radius of curvature, said flat portion and said concavo-convex portion of short radius of curvature having in common a zone of contiguity located in a part of the spring that is free to flex; and, along the inner periphery of the spring, an annular flange for maintaining the flat portion of the spring in substantially normal relation to the axis of the sealing unit.

5. A sealing unit according to claim 1 in which the means interconnecting the two springs are so disposed within the unit that they tend to ride on the shaft with which the sealing unit is used.

6. A sealing unit according to claim 1 in which the means interconnecting the two springs are so disposed within the unit that they stand well away from the shaft with which the sealing unit is used.

References Cited in the file of this patent

UNITED STATES PATENTS

| | | |
|---|---|---|
| 1,769,030 | Lassen | July 1, 1930 |
| 1,826,373 | Spreen | Oct. 6, 1931 |
| 2,089,570 | Petrelli | Aug. 10, 1937 |
| 2,251,020 | Murphy | July 29, 1941 |
| 2,274,137 | Frauenthal | Feb. 24, 1942 |
| 2,298,463 | Burt | Oct. 13, 1942 |
| 2,338,873 | Reynolds | Jan. 11, 1944 |
| 2,586,739 | Summers | Feb. 19, 1952 |
| 2,608,425 | Krug | Aug. 26, 1952 |

FOREIGN PATENTS

| | | |
|---|---|---|
| 601,296 | Great Britain | May 3, 1948 |